United States Patent
Kaneda et al.

(10) Patent No.: US 10,686,175 B2
(45) Date of Patent: Jun. 16, 2020

(54) POLYOLEFIN MICROPOROUS MEMBRANE, PRODUCTION METHOD THEREFOR, AND BATTERY SEPARATOR

(71) Applicant: TORAY INDUSTRIES, INC., Tokyo (JP)

(72) Inventors: Toshihiko Kaneda, Tochigi (JP); Go Sato, Tochigi (JP); Koichi Kono, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 227 days.

(21) Appl. No.: 15/539,084

(22) PCT Filed: Dec. 25, 2015

(86) PCT No.: PCT/JP2015/086416
§ 371 (c)(1),
(2) Date: Jun. 22, 2017

(87) PCT Pub. No.: WO2016/104790
PCT Pub. Date: Jun. 30, 2016

(65) Prior Publication Data
US 2017/0373291 A1   Dec. 28, 2017

(30) Foreign Application Priority Data
Dec. 26, 2014 (JP) ................. 2014-266010

(51) Int. Cl.
*H01M 4/02* (2006.01)
*H01M 2/16* (2006.01)
*C08J 9/28* (2006.01)
*H01M 2/14* (2006.01)
*C08F 10/02* (2006.01)
*H01M 10/00* (2006.01)

(52) U.S. Cl.
CPC ............ *H01M 2/162* (2013.01); *C08F 10/02* (2013.01); *C08J 9/28* (2013.01); *H01M 2/145* (2013.01); *H01M 2/16* (2013.01); *H01M 2/1653* (2013.01); *C08F 2500/12* (2013.01); *H01M 10/00* (2013.01)

(58) Field of Classification Search
CPC ....................................................... H01M 4/02
See application file for complete search history.

(56) References Cited

U.S. PATENT DOCUMENTS

| | | | | |
|---|---|---|---|---|
| 2012/0021266 A1* | 1/2012 | Marple | ............... | H01M 2/0225 429/94 |
| 2013/0017452 A1* | 1/2013 | Yamamoto | .......... | H01M 2/1653 429/254 |
| 2014/0315068 A1* | 10/2014 | Nishikawa | .......... | H01M 2/1653 429/145 |

FOREIGN PATENT DOCUMENTS

| | | |
|---|---|---|
| EP | 2408043 A1 | 1/2012 |
| JP | H05-222236 A | 8/1993 |
| JP | H05-222237 A | 8/1993 |
| JP | H08-102799 A | 1/1996 |
| JP | H11-279324 A | 10/1999 |
| JP | 2002/256099 A | 9/2002 |
| JP | 3347835 B | 11/2002 |
| JP | 2014/074143 A | 4/2014 |
| JP | 2014/222563 A | 11/2014 |
| WO | 2006/137540 A1 | 12/2006 |
| WO | 2011/011813 A1 | 2/2011 |
| WO | 2014/088065 A1 | 6/2014 |

OTHER PUBLICATIONS

Extended European Search Report dated Nov. 2, 2017 in European Patent Application No. 15873358.4, 7 pages.

* cited by examiner

*Primary Examiner* — Jacob B Marks
(74) *Attorney, Agent, or Firm* — Kilpatrick Townsend & Stockton LLP

(57) ABSTRACT

A polyolefin microporous membrane is disclosed. The membrane includes a polyolefin resin having an MFR value of not greater than 2.0 g/10 min, and a crystal nucleating agent. The polyolefin microporous membrane has an air permeation resistance scaled to a thickness of 20 μm of from 100 to 500 sec/100 cc, a porosity of from 20% to 60%, and a mean flow pore size of not greater than 100 nm.

9 Claims, No Drawings

POLYOLEFIN MICROPOROUS MEMBRANE, PRODUCTION METHOD THEREFOR, AND BATTERY SEPARATOR

CROSS-REFERENCE TO RELATED APPLICATIONS

This application is a United States National Phase Application of co-pending International Patent Application Number PCT/JP2015/086416, filed Dec. 25, 2015 and entitled "POLYOLEFIN MICROPOROUS MEMBRANE, PRODUCTION METHOD THEREFOR, AND BATTERY SEPARATOR," which Application claims priority to Japanese Patent Application Number 2014-266010, filed with the Japanese Patent Office on Dec. 26, 2014, the contents of which are incorporated herein by reference in their entirety.

TECHNICAL FIELD

The present invention relates to a polyolefin microporous membrane suitably used in a rechargeable battery separator, a coating separator substrate and the like.

BACKGROUND ART

As capacity and power of lithium ion rechargeable batteries have increased in recent years, the demand for improvement in mechanical strength such as a pin puncture strength and withstand voltage characteristics such as a dielectric breakdown voltage has been growing from the viewpoint of safety. In addition, thinner separators are being developed for lithium ion rechargeable batteries because the shorter distance between battery electrodes is preferable for a larger capacity and a higher output of the lithium ion rechargeable batteries. Therefore, the demands for improved mechanical strength and withstand voltage characteristics in lithium ion rechargeable batteries have increased from the viewpoint of preventing membrane puncture and shorting.

Patent Document 1 discloses a technology for improving withstand voltage characteristics and pin puncture strength by blending inorganic particles of a certain size to polyolefin. However, blending a large amount of fine particles in polyolefin impairs uniform dispersion of the fine particles and, because these particles are removed after the membrane formation, the membrane porosity increased excessively, resulting in insufficient withstand voltage characteristics. In addition, because the microporous membrane was formed by a process that requires a large amount of fine particles, there were issues regarding the process, the equipment, and maintenance.

Patent Document 2 discloses a technology for improving shut-down characteristics by blending a nucleating agent to a layer including polyolefin having a high MFR value to form a multilayer microporous membrane having a fine structure. However, there is a problem of decrease in the pin puncture strength if the polyethylene having an MFR value in this range, compared to the case where the high molecular weight polyethylene is used.

CITATION LIST

Patent Literature

Patent Document 1: JP 2014-74143A
Patent Document 2: WO 2011/11813A1

SUMMARY OF INVENTION

The present invention relates to a microporous membrane including a polyolefin resin having an MFR value of not greater than 2.0 g/10 min and a crystal nucleating agent, wherein the microporous membrane has an air permeation resistance, a porosity and a mean flow pore size in respective certain ranges, and exhibits superior pin puncture strength and withstand voltage characteristics.

Technical Problem

The object of the present invention is to provide a polyolefin microporous membrane which exhibits superior mechanical strength such as a pin puncture strength and withstand voltage characteristics such as a dielectric breakdown voltage and provides versatility and better safety.

Solution to Problem

The first aspect of the present invention is a polyolefin microporous membrane including a polyolefin resin and a crystal nucleating agent, wherein: the polyolefin resin has an MFR value of not greater than 2.0 g/10 min; and the polyolefin microporous membrane has an air permeation resistance scaled to 20 µm of from 100 to 500 sec/100 cc, a porosity of from 20% to 60%, and a mean flow pore size of not greater than 100 nm.

The polyolefin microporous membrane preferably includes not less than 90 mass % of a polyethylene resin.

The polyolefin microporous membrane preferably has a mean flow pore size of not greater than 50 nm. The polyolefin microporous membrane preferably has a dielectric breakdown voltage of not less than 163 V/µm and more preferably not less than 175 V/µm.

The polyolefin microporous membrane has a half-crystallization period $t_{1/2}$ of, preferably not greater than 2.0 minutes, and more preferably not greater than 1.5 minutes, during an isothermal crystallization at 123° C.

The second aspect of the present invention is a separator for a battery including the polyolefin microporous membrane, and the third aspect of the present invention is a rechargeable battery including the separator.

Advantageous Effects of Invention

The polyolefin microporous membrane according to an aspect of the present invention is a microporous membrane exhibiting superior mechanical strength such as a pin puncture strength and withstand voltage characteristics. Because of high mechanical strength and high withstand voltage characteristics thereof, the thickness of the polyolefin microporous membrane can be further reduced when used as a separator for a battery, thus increase in a battery capacity can be expected. The risk of shorting is also reduced and improvement in battery safety can also be expected.

DESCRIPTION OF EMBODIMENTS

Preferred embodiments of the present invention will be described hereinafter. Note that the present invention is not limited to the following embodiments, and various modifications may be added within the scope of the present invention.

1. Polyolefin Microporous Membrane

A polyolefin microporous membrane according to an embodiment of the present invention includes a mixture containing a polyolefin resin as a main component. The present invention will be described in detail hereinafter.

(1) Polyolefin Resin

Examples of the polyolefin resin include polyethylene, polypropylene, poly(4-methyl-pentene-1), ethylene-propylene copolymer, polytetrafluoroethylene, polytrifluorochloroethylene, polyvinylidene fluoride, polyvinylidene chloride, polyvinyl fluoride, polyvinyl chloride, polysulfone, and polycarbonate.

The polyolefin resin has an MFR value of not greater than 2.0 g/10 min and preferably of from 0.01 to 1.0 g/10 min. If the MFR value exceeds the range described above, mechanical strength such as the pin puncture strength of the polyolefin microporous membrane obtained may decrease. Note that the MFR value is measured in accordance with JIS K6922-2 by extruding the melt polymer from a die (length: 8 mm, outer diameter: 9.5 mm, inner diameter: 2.095 mm) at 190° C., under a load of 2.16 kg.

The polyolefin resin may be a mixture of not less than 2 types of polyolefin. If the polyolefin resin is a mixture of not less than 2 types of polyolefin, the MFR value of the mixture is preferably within the range described above.

(i) Polyethylene Resin

The polyolefin resin preferably contains a polyethylene resin. The content of the polyethylene resin is preferably not less than 90 mass %, more preferably not less than 95 mass % and particularly preferably not less than 99 mass % in the polyolefin resin. If the ratio of the polyethylene resin in the polyolefin resin is within the range described above, the strength of the polyolefin microporous membrane obtained can be improved.

For the polyethylene resin, (i) ethylene homopolymer, or (ii) a copolymer of ethylene and a comonomer such as propylene, 1-butene or 1-hexene, and a mixture thereof can be used.

Among these, from the viewpoint of economy and membrane strength, the ethylene homopolymer is preferable, and a high-density polyethylene having a Mw of not less than $1 \times 10^4$ and less than $1 \times 10^6$ is preferable. The molecular weight distribution (MWD) of the polyethylene resin is preferably from 1.0 to 20 and more preferably from 3.0 to 10.0 for example, from the viewpoint of extrusion formability and physical property control by means of stable crystallization control.

The content of the comonomer in the copolymer of the polyethylene resin is preferably not greater than 10.0 mol % per 100 mol % of the copolymer. Such a copolymer can be manufactured via any appropriate polymerization process such as a process in which a Ziegler-Natta catalyst or a single-site catalyst is used. The comonomer may be α-olefin, or if desired, the comonomer may be one or more types of propylene, 1-butene, 1-pentene, 1-hexene, 4-methyl-1-pentene, 1-octene, vinyl acetate, methyl methacrylate, styrene and the other monomers, for example.

The polyethylene resin has an MFR value of not greater than 2.0 g/10 min and preferably of from 0.01 to 1.0 g/10 min. If the MFR value of the polyethylene resin is not within the range described above, mechanical strength of the polyolefin microporous membrane obtained may decrease significantly. The MFR value of the polyethylene resin herein is a value measured in accordance with JIS K6922-2 under a condition of 190° C. and 2.16 kg load.

The polyolefin resin may include an ultrahigh molecular weight polyethylene having a weight average molecular weight of not less than $1.0 \times 10^6$ as the polyethylene resin in a range of from 1 mass % to 90 mass %, preferably in a range of from 1 mass % to 80 mass % and more preferably in a range of from 1 mass % to 70 mass %. If the ultrahigh molecular weight polyethylene having the weight average molecular weight of not less than $1.0 \times 10^6$ is included in the range described above, the high strength microporous membrane can be obtained without impairing the productivity of the polyolefin microporous membrane.

The polyethylene resin may be a single polyethylene or a mixture of two or more types of polyethylene. If the polyethylene resin is a mixture of two or more types of polyethylene, the MFR value of the mixture is preferably not greater than 2.0 g/10 min.

(ii) Other Resin Components

The polyolefin resin may contain resin components other than the polyethylene resin described above as necessary. A preferable example of the other resin components is a heat-resistant resin, and examples of the heat-resistant resins include crystalline resins (including partially crystalline resins) having a melting point of not lower than 150° C. and/or amorphous resins having a glass transition point (Tg) of not lower than 150° C. Here, Tg is a value measured in accordance with JIS K7121.

Specific examples of the other resin components include polyesters, polymethylpentenes (PMP or TPX (transparent polymer X), melting point: 230 to 245° C.), polyamides (PA, melting point: 215 to 265° C.), polyarylene sulfides (PAS), fluorine-containing resins such as vinylidene fluoride homopolymers such as polyvinylidene fluoride (PVDF) or fluorinated olefins such as polytetrafluoroethylene (PTFE) and copolymers thereof; polystyrenes (PS, melting point: 230° C.), polyvinyl alcohols (PVA, melting point: 220 to 240° C.), polyimides (PI, Tg: not lower than 280° C.), polyamideimides (PAI, Tg: 280° C.), polyether sulfones (PES, Tg: 223° C.), polyether ether ketones (PEEK, melting point: 334° C.), polycarbonates (PC, melting point: 220 to 240° C.), cellulose acetate (melting point: 220° C.), cellulose triacetate (melting point: 300° C.), polysulfones (Tg: 190° C.), and polyether imides (melting point: 216° C.). The resin components are not limited to a single resin component and may include a plurality of resin components. A preferable Mw of the other resin components differs depending on the type of the resin but is typically from $1 \times 10^3$ to $1 \times 10^6$ and is more preferably from $1 \times 10^4$ to $7 \times 10^5$. In addition, the content of the other resin components in the polyolefin resin is adjusted appropriately within a range that does not depart from the gist of the present invention, but the content is preferably within the range of approximately not greater than 10 mass % of the polyolefin resin.

Furthermore, a polyolefin other than the polyethylene described above may be included as necessary as the other resin components, and at least one type selected from the group consisting of polybutene-1, polypentene-1, polyhexene-1, and polyoctene-1 having a Mw of from $1 \times 10^4$ to $4 \times 10^6$ and polyethylene waxes having a Mw of from $1 \times 10^3$ to $1 \times 10^4$ may be used.

The content of the polyolefin other than the polyethylene described above may be adjusted appropriately within a range that does not diminish the effect of the present invention, but the content is preferably not greater than 10 mass %, more preferably less than 5 mass %, and even more preferably 0 mass % of the polyolefin resin.

(2) Crystal Nucleating Agent

The crystal nucleating agent that can be used in the microporous membrane of the present embodiment is not particularly limited, and typical compound-type and fine particulate-type crystal nucleating agents used for polyolefin resins can be used. The crystal nucleating agent can be used as a "master batch" in which the crystal nucleating agent is mixed and dispersed in the polyolefin resin in advance.

The blended amount of the crystal nucleating agent is not particularly limited. The upper limit of the blended amount is preferably 10 parts by mass, and more preferably 5 parts by mass per 100 parts by mass of the polyolefin resin while the lower limit is preferably 0.01 parts by mass and more preferably 0.1 parts by mass per 100 parts by mass of the polyolefin resin. If the blended amount of the crystal nucleating agent is within the range described above, good dispersibility in the polyolefin resin, and improved handling and cost effectiveness during manufacturing processes can be expected.

Compound-Type Crystal Nucleating Agent

Examples of the compound-type crystal nucleating agent include those typically used as a crystal nucleating agent for polyolefin resin, such as carboxylic acid metal salt-based nucleating agent including aromatic phosphate metal salt-based nucleating agents, sorbitol-based nucleating agents, and benzoate metal salt-based agents and mixtures thereof. Among these, the carboxylic acid metal salt-based nucleating agent that does not essentially include a hydrolysis group, such as aromatic phosphate metal salt-based nucleating agent and benzoate metal salt-based nucleating agent, and the mixture thereof are preferable.

For example, the following can be used: sodium benzoate, aluminum 4-tert-butylbenzoate, and aliphatic carboxylic acid metal salts such as sodium adipate, bicyclo[2.2.1]heptane-2,3-dicarboxylic acid disodium salt, sodium laurate, and zinc stearate; aromatic phosphate metal salts, sodium bis(4-tert-butylphenyl)phosphate, sodium 2,2'-methylenebis(4,6-di-tert-butylphenyl)phosphate, and lithium 2,2'-methylenebis(4,6-di-tert-butylphenyl)phosphate; and sorbitol-based compound, such as dibenzylidene sorbitol, bis(methylbenzylidene)sorbitol, and bis(dimethylbenzylidene)sorbitol. Among these compounds, the aromatic phosphate metal salt and the carboxylic acid metal salt are preferable from the viewpoint of strength and withstand voltage characteristics.

Fine Particulate-Type Crystal Nucleating Agent

As the fine particulate-type crystal nucleating agents, silica, and alumina can be used, for example.

Examples of commercially available nucleating agents include "GEL ALL D" (sorbitol-based nucleating agent, manufactured by New Japan Chemical Co., Ltd.), "ADK STAB" (aromatic phosphate metal salt-based nucleating agent, manufactured by Adeka Corp.), "Hyperform" (carboxylic acid metal salt-based nucleating agent, manufactured by Milliken Chemical), and "IRGACLEAR D" (sorbitol-based nucleating agent, manufactured by Chiba Specialty Chemicals). Alternatively, as a "master batch", which is a polyethylene resin blended with a crystal nucleating agent, "RIKEMASTER" (carboxylic acid metal salt-based nucleating agent, manufactured by Riken Vitamin, Co., Ltd.) is commercially available, for example.

(3) Other Additives

Note that various additives such as an antioxidant, an ultra-violet absorbent, a pigment and a dye can be added to the polyolefin resin described above, within a range that does not impair the objective of the present invention.

If the additive other than the nucleating agent is blended into the polyolefin resin, the blended amount thereof is preferably from 0.01 parts by mass to less than 10 parts by mass per 100 parts by mass of the polyolefin resin. If the blended amount is less than 0.01 parts by mass, sufficient effect may not be achieved or controlling the amount of addition during production may become difficult. If the blended amount is not less than 10 parts by mass, cost effectiveness may be compromised.

(4) Polyolefin Microporous Membrane

Physical properties of the polyolefin microporous membrane, such as a membrane thickness, a porosity, a pore size and an air permeation resistance, may not be particularly limited. However, these values are preferably controlled within the ranges described below.

Porosity

The upper limit of the porosity of the polyolefin microporous membrane according to an embodiment of the present invention is not greater than 60% and preferably not greater than 50% from the viewpoint of the membrane strength and the withstand voltage characteristics improvement. In addition, from the viewpoint of performance of lithium ion permeation and the like and of electrolyte solution content, the lower limit of the porosity is preferably not less than 20% and more preferably not less than 30%. The porosity within the range described above yields a good balance of ion permeability, membrane strength, and electrolyte solution content, which eliminates non-uniformity in the battery reaction and suppresses dendrite generation. Also, the withstand voltage characteristics can be improved because of the reduction in defects of the membrane structure. That is, a lithium ion rechargeable battery including the polyolefin microporous membrane according to an embodiment of the present invention as a battery separator exhibits superior safety, strength and permeability. The measurement method of the porosity will be described below.

The porosity of the polyolefin microporous membrane according to an embodiment of the present invention can be controlled by conventionally known methods. The porosity can be controlled by reducing the size of crystals of the polyolefin resin by controlling crystallization rate of the mixture and using a crystal nucleating agent or by controlling the temperature and membrane stretching conditions.

Mean Flow Pore Size

The upper limit of the mean flow pore size of the polyolefin microporous membrane according to an embodiment of the present invention is not greater than 300 nm, preferably not greater than 100 nm and more preferably not greater than 50 nm from the viewpoint of the membrane strength and the withstand voltage characteristics improvement. The lower limit of the mean flow pore size of the polyolefin microporous membrane according to an embodiment of the present invention is not particularly limited, but it is preferably not less than 1 nm and more preferably not less than 5 nm, considering the relationship with the air permeation resistance described below. If the mean flow pore size of the polyolefin microporous membrane according to an embodiment of the present invention is within the range described above, the structure of the microporous membrane is dense, and the superior strength and withstand voltage characteristics can be achieved.

Maximum Pore Size

The upper limit of the maximum pore size of the polyolefin microporous membrane according to an embodiment of the present invention is not greater than 500 nm, preferably not greater than 300 nm and more preferably not greater than 80 nm from the viewpoint of the membrane strength and the withstand voltage characteristics improvement. The lower limit of the maximum pore size of the polyolefin microporous membrane according to an embodiment of the present invention is not particularly limited, but it is preferably not less than 1 nm and more preferably not less than 5 nm, considering the relationship with the air permeation resistance described below. If the maximum pore size of the polyolefin microporous membrane according to an embodiment of the present invention is within the range described above, the structure of the microporous membrane is dense, and the superior membrane strength and withstand voltage characteristics can be achieved.

The maximum pore size and mean flow pore size of the polyolefin microporous membrane can be measured using a perm porometer (CFP-1500A manufactured by PMI) in the order of Dry-up and Wet-up. For Wet-up, pressure was applied to a microporous membrane sufficiently immersed in Galwick (trade name) manufactured by PMI which has a known surface tension, and the pore size converted from the pressure at which air begins to pass through the membrane was defined as the maximum pore size.

For the mean flow pore size, the pore size was calculated from the pressure at a point of intersection between a curve from the Wet-up measurement and a curve, in which one-half of the values of the Dry-up curve in the pressure-flow rate plot. The following equation is used for the conversion of pressure and pore size.

$$d=C\gamma/P$$

where "d (μm)" is the pore size of the microporous membrane; "γ (mN/m)" is the surface tension of the liquid; "P (Pa)" is the pressure; and "C" is a constant.

The mean flow pore size and maximum pore size of the polyolefin microporous membrane according to an embodiment of the present invention can be controlled by reducing the size of crystals of the polyolefin resin by controlling crystallization rate of the mixture and using a crystal nucleating agent or by controlling the temperature and membrane stretching conditions.

Air Permeation Resistance

The air permeation resistance of the polyolefin microporous membrane according to an embodiment of the present invention, when scaled to a membrane thickness of 20 μm, is from 100 to 1000 sec/100 cc, preferably from 100 to 800 sec/100 cc, and particularly preferably from 100 to 600 sec/100 cc. If the air permeation resistance exceeds 1000 sec/100 cc, ion permeability may be degraded and the electrical resistance may increase when used as a battery separator. Thus, it is not preferable. On the other hand, if the air permeation resistance is less than 100 sec/100 cc, the membrane structure becomes exceedingly coarse, resulting in insufficient shutdown upon the battery internal temperature increase, and/or in decrease in dielectric breakdown voltage when used as a battery separator.

Here, the air permeation resistance scaled to 20 μm membrane thickness refers to the air permeation resistance $P_2$ calculated by the equation $P_2=(P_1\times20)/T_1$, where $P_1$ is the air permeation resistance measured in accordance with JIS P 8117 (2009) for a microporous membrane having a membrane thickness $T_1$ (μm). Note that in this specification, unless stated specifically with regard to the membrane thickness, the phrase "air permeation resistance" is used to mean the "air permeation resistance at a membrane thickness of 20 μm".

The air permeation resistance of the polyolefin microporous membrane according to an embodiment of the present invention can be controlled by reducing the size of crystals of the polyolefin resin by controlling crystallization rate of the mixture and using a crystal nucleating agent or by controlling the temperature and membrane stretching conditions.

Pin Puncture Strength

The pin puncture strength of the polyolefin microporous membrane according to an embodiment of the present invention, when scaled to a membrane thickness of 20 μm, is preferably not less than 400 gf and more preferably not less than 550 gf. If the pin puncture strength is within this range, the membrane would not puncture even if the thickness thereof is reduced, thus improving safety.

Here, the pin puncture strength scaled to 20 μm membrane thickness can be determined as follows: the maximum load is measured when a needle of 1 mm diameter having a spherical tip (the radius of the curvature R: 0.5 mm) is pierced through the microporous membrane of the membrane thickness $T_1$ (μm) at a speed of 2 mm/sec. The measured value of the maximum load $L_1$ (go is converted to the maximum load $L_2$ when the membrane thickness is assumed as 20 μm, using the equation: $L_2=(L_1\times20)/T_1$.

The pin puncture strength of the polyolefin microporous membrane when scaled to 20 μm membrane thickness according to an embodiment of the present invention can be controlled by reducing the size of crystals of the polyolefin resin by controlling crystallization rate of the mixture and using a crystal nucleating agent or by controlling the temperature and membrane stretching conditions.

Membrane Thickness

The membrane thickness of the polyolefin microporous membrane according to an embodiment of the present invention is preferably from 1 to 2000 μm, and more preferably from 1 to 1000 μm. The measurement method of the membrane thickness will be described below.

Half-crystallization period $t_{1/2}$ during an isothermal crystallization at 123° C. The polyolefin microporous membrane according to an embodiment of the present invention has a half-crystallization period $t_{1/2}$, the upper limit of which is preferably 2.0 minutes, and more preferably 1.5 minutes, during an isothermal crystallization at 123° C. The polyolefin microporous membrane has a half-crystallization period $t_{1/2}$, the lower limit of which is not particularly limited, but preferably 0.02 minutes, and more preferably 0.1 minutes, during an isothermal crystallization at 123° C. In particular, if the polyolefin resin includes polyethylene resin at not less than 90 mass %, and the half-crystallization period $t_{1/2}$ of the polyolefin microporous membrane during an isothermal crystallization at 123° C. is within the range described above, the mechanical strength and the withstand voltage characteristics are preferably superior.

The half-crystallization period $t_{1/2}$ during an isothermal crystallization at 123° C. can be determined from the time ($t_{1/2}$) that requires the quantity of heat measured during an isothermal crystallization measurement at 123° C. to correspond to the half of the peak area in differential scanning calorimetry (DSC) measurement. Specific measurement method of the half-crystallization period $t_{1/2}$ during an isothermal crystallization at 123° C. is described below.

Dielectric Breakdown Voltage

The polyolefin microporous membrane according to an embodiment of the present invention preferably has a dielectric breakdown voltage of not less than 135 V/μm, more preferably not less than 150 V/μm and particularly preferably not less than 164 V/μm. The upper limit of the dielectric breakdown voltage is not particularly limited, but the typical upper limit thereof is considered not to exceed 300 V/μm. If the dielectric breakdown voltage of the polyolefin microporous membrane is within the range described above, superior battery durability and withstand voltage performance can be expected when used as a battery separator.

The dielectric breakdown voltage of the polyolefin microporous membrane according to an embodiment of the present invention can be measured in accordance with methods defined in JIS C2110 or ASTM D149, for example.

2. Method of Producing Polyolefin Microporous Membrane

The method of producing the polyolefin microporous membrane according to an embodiment of the present invention is not particularly limited as long as a polyolefin microporous membrane having the characteristics described above can be produced, and conventionally known methods may be used. For example, the methods described in the specifications of JP-B-2132327, JP-B-3347835, and WO 2006/137540 can be used. Specifically, the method preferably includes the steps (1) to (5) described below and may further include the step (6) described below. The method may even further include the step (7) and/or (8) described below.

(1) melt-kneading a polyolefin resin, a crystal nucleating agent and a solvent for membrane formation to prepare a polyolefin resin composition;

(2) extruding and cooling the polyolefin resin composition to form a gel sheet;

(3) performing a first stretching step of stretching the gel sheet;

(4) removing the solvent for membrane formation from the gel sheet after stretching;

(5) drying the sheet after removing the solvent for membrane formation;

(6) performing a second stretching step of stretching the sheet after drying;

(7) heat-treating the sheet after drying;

(8) performing crosslinking treatment and/or hydrophilization treatment on the sheet after stretching.

Each step will be described hereinafter.

(1) Melt-Kneading Polyolefin Resin Composition to Form a Gel Sheet

After blending a suitable solvent for membrane formation with the polyolefin resin, the mixture is melt-kneaded to prepare a polyolefin resin composition. Methods using a twin-screw extruder described in the specifications of JP-B-2132327 and JP-B-3347835B can be used as a melt-kneading method. Since melt-kneading methods are publicly known, description is omitted.

In the polyolefin resin composition, the blending ratio of the polyolefin resin to the solvent for membrane formation is not particularly limited, but the content of the solvent for membrane formation is preferably from 70 to 80 parts by mass per 20 to 30 parts by mass of the polyolefin resin.

The content of the crystal nucleating agent blended in the polyolefin resin composition is described above.

(2) Extruding and Cooling the Polyolefin Resin Composition to Form a Gel Sheet

The polyolefin resin composition is fed from the extruder to a die and extruded into a sheet form. A plurality of polyolefin solutions of the same or different polyolefin resin compositions may be fed from the extruder to a single die, laminated therein into a layer shape, and extruded into a sheet form.

The extrusion method may be the flat die method or the inflation method. The extrusion temperature is preferably from 140 to 250° C., and the extrusion rate is preferably from 0.2 to 15 m/min. The membrane thickness can be adjusted by adjusting the extruded amount of each polyolefin rein composition.

Methods disclosed in JP-B-2132327 and JP-B-3347835 can be used as an extrusion method.

A gel sheet is formed by cooling the extrudate obtained. Methods disclosed in JP-B-2132327 and JP-B-3347835 can be used as a method of forming a gel sheet. Cooling is preferably performed at a rate of not less than 50° C./min up to at least the gelation temperature. Cooling is preferably performed up to not higher than 25° C.

(3) Performing a First Stretching Step of Stretching the Gel Sheet

Next, the obtained gel sheet is stretched in at least a uniaxial direction. Since the gel sheet contains the solvent for membrane formation, the gel sheet can be stretched uniformly. The gel sheet is preferably stretched at a prescribed magnification by a tenter method, a roll method, an inflation method, or a combination thereof after heating. Stretching may be uniaxial stretching or biaxial stretching, but biaxial stretching is preferable. In the case of biaxial stretching, simultaneous biaxial stretching, sequential stretching, or multi-stage stretching (for example, a combination of simultaneous biaxial stretching and sequential stretching) may be used.

The stretching magnification (area stretching magnification) in this step is preferably not less than 2 and more preferably from 3 to 30 in the case of uniaxial stretching. In the case of biaxial stretching, the stretching magnification is preferably not less than 9, more preferably not less than 16, and particularly preferably not less than 25. In addition, a stretching magnification of not less than 3 is preferable in both the machine and transverse directions (MD and TD), and the stretching magnifications in MD and TD may be same as or different from one another. When the stretching magnification is set to not less than 9, an enhancement in the pin puncture strength can be expected. Note that the stretching magnification in this step refers to the area stretching magnification of the microporous membrane immediately prior to being used in the next step, using the microporous membrane immediately prior to this step as a reference.

The stretching temperature in this step is preferably selected to be within the range of from the crystalline dispersion temperature (Tcd) of the polyolefin resin to Tcd+30° C., more preferably within the range of from the crystalline dispersion temperature (Tcd)+5° C. to the crystalline dispersion temperature (Tcd)+28° C., and particularly preferably within the range of from Tcd+10° C. to Tcd+26° C. If the stretching temperature is within the range described above, membrane puncture due to the stretching of the polyolefin resin is suppressed, and stretching to a higher magnification can be performed.

The crystalline dispersion temperature (Tcd) is determined by temperature-characteristic measurement of the dynamic viscoelasticity in accordance with ASTM D4065. Because the ultrahigh molecular weight polyethylene, the polyethylene other than the ultrahigh molecular weight polyethylene, and the polyethylene composition have a crystalline dispersion temperature of approximately 90 to 100° C., the stretching temperature is preferably from 90 to 130° C., more preferably from 110 to 120° C., even more preferably from 114 to 117° C.

Such stretching causes cleavage between polyethylene lamella layers, and the polyethylene phase becomes finer, forming a large number of fibrils. The fibrils form a mesh structure with three-dimensional irregular linkages.

(4) Removal of Solvent for Membrane Formation

The solvent for membrane formation is removed (washed) using a washing solvent. Because the phase of the polyolefin is separated from the phase of the solvent for membrane formation, when the solvent for membrane formation is removed, a porous membrane including fibrils which form a fine three-dimensional network structure and having pores (voids) which communicate three-dimensionally and irregularly is obtained. Washing solvents and methods of removing the solvent for membrane formation using the washing solvent has been publicly known, and thus description is omitted. For example, methods disclosed in JP-B-2132327 or JP-A-2002-256099 can be used.

(5) Drying the Sheet after Removing the Solvent for Membrane Formation

The microporous membrane from which the solvent for membrane formation has been removed is dried by a heat-drying or an air-drying. The drying temperature is preferably not higher than the crystalline dispersion temperature (Tcd) of the polyolefin resin and is particularly preferably at least 5° C. lower than the Tcd. Drying is preferably performed until the residual washing solvent is not greater than 5 parts by mass and more preferably not greater than 3 parts by mass per 100 parts by mass (dry weight) of the microporous membrane.

(6) Performing a Second Stretching Step of Stretching the Sheet after Drying

The microporous membrane after drying is preferably stretched in at least a uniaxial direction. The stretching of the microporous membrane can be performed by a tenter method or the like while heating in the same manner as described above. Stretching may be uniaxial stretching or biaxial stretching. In the case of biaxial stretching, simultaneous biaxial stretching or successive stretching can be performed.

The stretching temperature in this step is not particularly limited, but is ordinarily from 90 to 135° C. and more preferably from 95 to 130° C.

The lower limit of the stretching magnification (area stretching magnification) in the uniaxial direction at the time of the stretching of the microporous membrane in this step is preferably not less than 1.0, more preferably not less than 1.1, and even more preferably not less than 1.2. In addition, the upper limit is preferably not greater than 1.8. In the case of uniaxial stretching, the stretching magnification is from 1.0 to 2.0 in MD or TD. In the case of biaxial stretching, the lower limit of the area stretching magnification is preferably not less than 1.0, more preferably not less than 1.1, and even more preferably not less than 1.2. The upper limit is preferably not greater than 3.5. The stretching magnifications in MD and TD may respectively be set to from 1.0 to 2.0, and the stretching magnifications in MD and TD may be same as or different from one another. Note that the stretching magnification in this step refers to the stretching magnification of the microporous membrane immediately prior to being subjected to the next step relative to the microporous membrane immediately prior to this step.

(7) Heat-Treating the Sheet after Drying

In addition, the microporous membrane after drying may be subjected to heat treatment. Heat treatment causes crystal stabilization and lamella uniformization. Heat setting treatment and/or heat relaxation treatment may be used as a heat treatment method. The heat setting treatment is a heat treatment that heats in a manner that the size of a membrane is maintained and not changed. The heat relaxation treatment is a heat treatment in which the membrane is thermally shrunk in MD and/or TD during heating. Heat setting treatment is preferably performed by a tenter method or a roll method. An example of the heat relaxation treatment method includes a method disclosed in JP-A-2002-256099. The heat treatment temperature is preferably within the range of from Tcd to Tm of the polyolefin resin, more preferably within the range of ±5° C. of the stretching temperature of the microporous membrane, and particularly preferably within the range of ±3° C. of the second stretching temperature of the microporous membrane.

(8) Performing Crosslinking Treatment and/or Hydrophilization Treatment on the Sheet after Stretching Additionally, the microporous membrane after bonding or stretching may be further subjected to crosslinking treatment and hydrophilization treatment.

For example, crosslinking treatment is performed by irradiating the microporous membrane with ionizing radiation such as α-rays, β-rays, γ-rays, or an electron beam. In the case of electron beam irradiation, an electron beam dose of from 0.1 to 100 Mrad is preferable, and an acceleration voltage of from 100 to 300 kV is preferable. The meltdown temperature of the microporous membrane increases due to crosslinking treatment.

In addition, hydrophilization treatment can be performed by monomer graft, surfactant treatment, corona discharge and the like. Monomer graft is preferably performed after the crosslinking treatment.

3. Multi-Layer Microporous Membrane

In addition, a microporous layer may be provided on at least one surface of the polyolefin microporous membrane to form a multi-layer porous membrane. Examples of the porous layer include a porous layer formed using a filler-containing resin solution containing a filler and a resin binder or a heat-resistant resin solution.

As the filler, a conventionally known inorganic filler or an organic filler such as a crosslinked polymer filler can be used. Such a filler preferably has a melting point of not lower than 200° C., has high electrical insulating properties, and is electrochemically stable within the scope of use of a lithium ion rechargeable battery. One type of these may be used alone, or two or more types may be used in combination.

The average particle size of the filler is not particularly limited, but is preferably not less than 0.1 μm and not greater than 3.0 μm.

The proportion of the filler in the porous layer (mass fraction) is preferably not less than 50% and not greater than 99.99% from the perspective of heat resistance.

A polyolefin or heat-resistant resin described in the section regarding other resin components included in the polyolefin resin described above may be suitably used as the resin binder.

The proportion of the amount of resin binder out of the total amount of the filler and the resin binder is preferably not less than 0.5% and not greater than 8% in terms of the volume fraction from the perspective of the binding capacity of both components.

The same heat-resistant resins as those described in the section regarding other resin components included in the polyolefin resin described above may be suitably used as the heat-resistant resin.

The method for applying the filler-containing resin solution or heat-resistant resin solution to the surface of the polyolefin microporous membrane is not particularly limited as long as the method can achieve the required layer thickness or coating area, such as the gravure coater method.

The solvent for the filler-containing solution or the heat-resistant resin solution is not particularly limited but is preferably a solvent which can be removed from the solution applied to the polyolefin microporous membrane. Specific examples include N-methylpyrrolidone, N,N-dimethylformamide, N,N-dimethylacetamide, water, ethanol, toluene, heated xylene, methylene chloride, and hexane.

The method for removing the solvent is not particularly limited as long as the method does not have an adverse effect on the polyolefin microporous membrane. Specific examples include a method of drying the polyolefin microporous membrane at a temperature lower than or equal to the melting point thereof while immobilizing the polyolefin microporous membrane, a method of drying the polyolefin microporous membrane under reduced pressure, and a method of immersing the polyolefin microporous membrane in a poor solvent of the resin binder or the heat-resistant resin so as to coagulate the resin and simultaneously extract the solvent.

The thickness of the porous layer is preferably not less than 0.5 μm and not greater than 100 μm from the perspective of enhancing the heat resistance.

In the multi-layer porous membrane according to an embodiment of the present invention, the proportion of the thickness of the porous layer relative to the thickness of the multi-layer porous membrane may be adjusted appropriately before use in accordance with the purpose. Specifically, the proportion is preferably not less than 15% and not greater than 80% and more preferably not less than 20% and not greater than 75%.

In addition, the porous layer may be formed on one surface of the multi-layer porous membrane or may be formed on both surfaces thereof.

4. Battery Separator

The polyolefin microporous membrane according to an embodiment of the present invention can be suitably used in a battery using an aqueous electrolytic solution or a battery using a non-aqueous electrolytic solution. Specifically, the polyolefin multilayer microporous membrane can be preferably used as a separator for a rechargeable battery such as a nickel-hydrogen battery, a nickel-cadmium battery, a nickel-zinc battery, a silver-zinc battery, a lithium rechargeable battery, or a lithium polymer rechargeable battery. Of these, the polyolefin multilayer microporous membrane is preferably used as a separator for a lithium ion rechargeable battery.

In a lithium ion rechargeable battery, a positive electrode and a negative electrode are laminated with a separator interposed therebetween, and the separator contains an electrolytic solution (an electrolyte). The electrode structure is not particularly limited, and a conventionally known structure may be used. For example, an electrode structure in which disc-shaped positive electrode and negative electrode are placed to face each other (coin type), an electrode structure in which planar positive electrodes and negative electrodes are alternately laminated (lamination type), an electrode structure in which a laminated band-shaped positive electrode and negative electrode are wound (winding type), and the like can be employed.

The current collector, positive electrode, positive electrode active material, negative electrode, negative electrode active material, and electrolytic solution used in the lithium ion rechargeable battery are not particularly limited, and conventionally known materials may be appropriately used in combination.

Note that the present invention is not limited to the above embodiments, and various modifications may be added within the scope of the present invention.

EXAMPLES

The present invention will be described in further detail using examples below, but the embodiments of the present invention are not limited to these examples.

Note that the evaluation methods, each of the analysis methods, and the materials used in the examples are as follows.

(1) Membrane Thickness (μm)

The membrane thicknesses of five points of the microporous membrane within a range of 95 mm×95 mm were measured with a contact thickness meter (Litematic manufactured by Mitsutoyo Co., Ltd.), and the average value was determined.

(2) Porosity (%)

The porosity was measured using the following equation, wherein the weight $w_1$ of the microporous membrane and the weight $w_2$ of an equivalent polymer not having pores (polymer having the same width, length, and composition) were compared.

Porosity (%)=$(w_2-w_1)/w_2 \times 100$ (3) Air Permeation Resistance (sec/100 cc)

The air permeation resistance $P_1$ (sec/100 cc) measured for the microporous membrane of the membrane thickness $T_1$ (μm) by Air Permeability Tester (EGO-1T, manufactured by Asahi Seiko Co., Ltd.) in accordance with JIS P 8117. Then, the air permeation resistance $P_2$ scaled to the membrane thickness of 20 μm was calculated using the Equation: $P_2=(P_1 \times 20)/T_1$.

(4) Maximum Pore Size and Mean Flow Pore Size (nm)

The maximum pore size and mean flow pore size were measured in the order of Dry-up and Wet-up using a perm porometer (CFP-1500A, manufactured by PMI). For Wet-up, pressure was applied to a microporous membrane sufficiently immersed in Galwick (trade name) manufactured by PMI which has a known surface tension, and the pore size converted from the pressure at which air begins to pass through the membrane was defined as the maximum pore size.

For the mean flow pore size, the pore size was calculated from the pressure at a point of intersection between a curve from the Wet-up measurement and a curve that has a ½ slope of the Dry-up curve in the pressure-flow rate plot. The following equation was used for the conversion of pressure and pore size.

$d=C\gamma/P$ where "d (μm)" is the pore size of the microporous membrane; "γ (mN/m)" is the surface tension of the liquid; "P (Pa)" is the pressure; and "C" is a constant.

(5) Pin Puncture Strength (gf/20 μm)

A maximum load was measured when a needle of 1 mm diameter having a spherical tip (the radius of the curvature R: 0.5 mm) was pierced through the microporous membrane of the membrane thickness $T_1$ (μm) at a speed of 2 mm/sec. The measured maximum load $L_1$ (gf) was converted to the maximum load $L_2$ scaled to a 20 μm membrane thickness by the equation: $L_2=(L_1 \times 20)/T_1$, and the pin puncture strength was thereby obtained.

(6) Weight Average Molecular Weight

The Mw of UHMwPE and HDPE were determined by gel permeation chromatography (GPC) under the following conditions.

Measurement apparatus: GPC-150C, manufactured by Waters Corporation

Column: Shodex UT806M, manufactured by Showa Denko, K. K.

Column temperature: 135° C.

Solvent (mobile phase): o-dichlorobenzene

Solvent flow rate: 1.0 mL/min

Sample concentration: 0.1 wt. % (dissolution condition: 135° C./1 h)

Injection quantity: 500 μL

Detector: differential refractometer, manufactured by Waters Corporation (RI detector)

Calibration curve: Created using predetermined conversion constant from calibration curve obtained using monodisperse polystyrene standard sample (7) MFR Value The MFR value was measured in accordance with HS K6922-2, under the conditions of 190° C. and 2.16 kg load. If the amount of the resin extrudate for a 10 minute period was less than 2.0 g, it was recorded as "less than 2.0".

(8) Half-Crystallization Period $t_{1/2}$ During an Isothermal Crystallization at 123° C.

The half-crystallization period $t_{1/2}$ during an isothermal crystallization at 123° C. was measured as follows. The polyolefin microporous membrane was sealed in a measurement pan and completely melted by raising the temperature to 230° C. using PYRIS Diamond DSC manufactured by Parking Elmer. Afterwards, the temperature was lowered to 123° C. at the rate of 30° C./min and kept at 123° C. The change in quantity of heat as a function of time after the isothermal control at 123° C. started was recorded. The time which required the quantity of heat measured correspond to the half of the peak area was defined as the half-crystallization period $t_{1/2}$ during an isothermal crystallization at 123° C.

(9) Dielectric Breakdown Voltage

The microporous membrane, cut into a circular piece of 60 mm diameter, was placed on a square aluminum plate having a 150 mm side. On top of the microporous membrane, a columnar brass electrode (diameter: 50 mm, height: 30 mm, weight: 500 g) was placed and connected to the Withstanding voltage and Insulation Resistance Tester (TOS 5051A manufactured by Kikusui Electronics Corp.). The voltage was applied at an increase rate of 0.2 kV/sec and the voltage at which the dielectric breakdown occurred was recorded. Dielectric breakdown voltage was measured 15 times for each and the voltage at which the dielectric breakdown occurred was recorded.

Example 1

A mixture was obtained by dry-blending 0.375 parts by mass of tetrakis[methylene-3-(3,5-di-tert-butyl-4-hydroxyphenyl)-propionate]methane and 3 parts by mass of "MASTER BATCH" RIKEMASTER CN-002 (nucleating agent content: ca. 2 mass %, manufactured by Riken Vitamin, Co., Ltd.) into 100 parts by mass of a polyethylene (PE) composition comprising 30 parts by mass of an ultra-high molecular weight polyethylene (UHMwPE) having a weight average molecular weight (Mw) of $2.0 \times 10^6$ and 70 parts by mass of a high-density polyethylene (HDPE) having a Mw of $2.8 \times 10^5$.

A polyethylene resin composition was prepared by charging 30 parts by mass of the obtained mixture into a strong kneading type twin-screw extruder, supplying 70 parts by mass of liquid paraffin from a side feeder of the twin-screw extruder, and melt-kneading at a temperature of 210° C. while maintaining the screw rotation speed Ns at 180 rpm.

The obtained polyethylene resin composition was supplied from the twin-screw extruder to a T-die and was extruded so as to form a sheet-like extrudate. The extrudate was cooled while being drawn with a cooling roll adjusted to a temperature of 35° C. so as to form a gel sheet. The obtained gel sheet was subjected to simultaneous biaxial stretching at the stretching temperature of 115° C. to the magnification of 5 times in MD and 5 times in TD. The stretched membrane was washed in a washing tank of methylene chloride adjusted to a temperature of 25° C., and the liquid paraffin was removed. The washed membrane was dried with a drying furnace adjusted to 60° C., and the membrane was subjected to heat setting treatment for 40 seconds at 125° C. in a tenter so as to obtain a polyolefin microporous membrane having a thickness of 20 μm. The properties of the microporous membrane obtained are listed in Table 1.

Example 2

The polyolefin microporous membrane was obtained in the same manner as in Example 1, except that 100 parts by mass of the polyethylene (PE) composition comprising 40 parts by mass of an ultrahigh molecular weight polyethylene (UHMwPE) having a weight average molecular weight (Mw) of $1.0 \times 10^6$ and 60 parts by mass of a high-density polyethylene (HDPE) having a Mw of $2.8 \times 10^5$ was used. The properties of the microporous membrane obtained are listed in Table 1.

Example 3

The polyolefin microporous membrane was obtained in the same manner as in Example 2 except that the gel sheet was subjected to simultaneous biaxial stretching at the stretching temperature of 115° C. to the magnification of 7 times in MD and 7 times in TD. The properties of the microporous membrane obtained are listed in Table 1.

Example 4

The polyolefin microporous membrane was obtained in the same manner as in Example 1, except that 100 parts by mass of the polyethylene (PE) composition comprising 100 parts by mass of a high-density polyethylene (HDPE) having a weight average molecular weight (Mw) of $2.8 \times 10^5$ was used. The properties of the microporous membrane obtained are listed in Table 1.

Example 5

The polyolefin microporous membrane was obtained in the same manner as in Example 4 except that 3 parts by mass of GEL ALL D (sorbitol-based crystal nucleating agent, manufactured by New Japan Chemical Co., Ltd.) instead of RIKEMASTER CN-002 (manufactured by RIKEN VITAMIN, Co., Ltd.) was used. The properties of the microporous membrane obtained are listed in Table 1.

Comparative Example 1

The polyolefin microporous membrane was obtained in the same manner as in Example 4 except that "master batch" RIKEMASTER CN-002 (manufactured by RIKEN VITAMIN, Co., Ltd.) was not blended. The properties of the microporous membrane obtained are listed in Table 2.

Comparative Example 2

The polyolefin microporous membrane was obtained in the same manner as in Example 4 except that 3 parts by mass of calcium stearate instead of "master batch" RIKEMASTER CN-002 (manufactured by RIKEN VITAMIN, Co., Ltd.) was used. The properties of the microporous membrane obtained are listed in Table 2.

Comparative Example 3

The polypropylene monolayer microporous membrane produced by the dry uniaxial stretching method was evaluated and the properties thereof were listed in Table 2.

Comparative Example 4

The polyolefin microporous membrane was obtained in the same manner as in Comparative Example 1, except that 100 parts by mass of the polyethylene (PE) composition containing 20 parts by mass of an ultra-high molecular weight polyethylene (UHMwPE) having a weight average molecular weight (Mw) of $1.0 \times 10^6$ and 80 parts by mass of a high-density polyethylene (HDPE) having a Mw of $2.8 \times 10^5$ was used. The properties of the microporous membrane obtained are listed in Table 2.

TABLE 1

|  | Example 1 | Example 2 | Example 3 | Example 4 | Example 5 |
|---|---|---|---|---|---|
| HDPE (parts by mass) | 70 | 60 | 60 | 100 | 100 |
| UHMwPE (parts by mass) | 30 | 40 | 40 | 0 | 0 |
| MFR value (g/10 min) | Less than 2.0 | Less than 2.0 | Less than 2.0 | Less than 2.0 | Less than 2.0 |
| Fine particle content (parts by mass) | 0.03 | 0.03 | 0.03 | 0.01 | 0 |
| Half-crystallization period $t_{1/2}$ during an isothermal crystallization at 123° C. | 1.5 | 1.2 | 1.1 | 1.0 | 1.5 |
| Porosity | 39 | 40 | 40 | 44 | 35 |
| Mean flow pore size (nm) | 20 | 21 | 26 | 23 | 28 |
| Maximum pore size (nm) | 35 | 38 | 45 | 46 | 40 |
| Air permeation resistance @ 20 μm (sec/100 cc) | 463 | 340 | 404 | 284 | 467 |
| Pin puncture strength @ 20 μm (gf) | 578 | 597 | 898 | 473 | 524 |
| Dielectric breakdown voltage (V/μm) | 179 | 177 | 177 | 165 | 159 |

TABLE 2

|  | Comparative Example 1 | Comparative Example 2 | Comparative Example 3 | Comparative Example 4 |
|---|---|---|---|---|
| HDPE (parts by mass) | 100 | 100 | — | 80 |
| UHMwPE (parts by mass) | 0 | 0 | — | 20 |
| MFR value (g/10 min) | Less than 2.0 | Less than 2.0 | — | Less than 2.0 |
| fine particle content (parts by mass) | 0 | 0 | — | 0 |
| Half-crystallization period $t_{1/2}$ during an isothermal crystallization at 123° C. | 2.5 | 2.3 | — | 2.8 |
| Porosity | 48 | 46 | 40 | 63 |
| Mean flow pore size (nm) | 25 | 30 | 20 | 52 |
| Maximum pore size (nm) | 55 | 54 | 30 | 73 |
| Air permeation resistance @ 20 μm (sec/100 cc) | 203 | 212 | 500 | 74 |
| Pin puncture strength @ 20 μm (gf) | 283 | 296 | 367 | 206 |
| Dielectric breakdown voltage (V/μm) | 131 | 133 | 100 | 104 |

As shown in Tables 1 and 2, the dielectric breakdown voltage was obviously higher for Examples than for Comparative Examples. Thus, improvement of the withstand voltage characteristics of the polyolefin microporous membrane was observed. In addition, the pin puncture strength was obviously higher for Examples than for Comparative Examples. Thus, improvement of the mechanical strength of the polyolefin microporous membrane was observed.

INDUSTRIAL APPLICABILITY

The polyolefin microporous membrane according to the present invention has superior mechanical strength and withstand voltage characteristics, thereby, can be suitably used for rechargeable batteries such as a non-aqueous electrolyte rechargeable battery represented by a lithium ion rechargeable battery.

The invention claimed is:

1. A polyolefin microporous membrane, comprising:
    a polyolefin resin having an MFR value of not greater than 2.0 g/10 min; and
    a crystal nucleating agent,
    wherein the polyolefin microporous membrane has an air permeation resistance scaled to a thickness of 20 μm of from 100 to 500 sec/100 cc, a porosity of from 20% to 60%, and a mean flow pore size of not greater than 100 nm,
    wherein a half-crystallization period $t_{1/2}$ of the polyolefin microporous membrane is not greater than 2.0 minutes during an isothermal crystallization at 123° C.

2. The polyolefin microporous membrane according to claim 1, wherein the polyolefin resin comprises not less than 90 mass % of a polyethylene resin.

3. The polyolefin microporous membrane according to claim 1, wherein the mean flow pore size is not greater than 50 nm.

4. The polyolefin microporous membrane according to claim 1, having a dielectric breakdown voltage of not less than 163 V/μm.

5. The polyolefin microporous membrane according to claim 1, having a dielectric breakdown voltage of not less than 175 V/μm.

6. A battery separator, comprising:
    a polyolefin microporous membrane, comprising:
        a polyolefin resin having an MFR value of not greater than 2.0 g/10 min; and
        a crystal nucleating agent,
        wherein the polyolefin microporous membrane has an air permeation resistance scaled to a thickness of 20 μm of from 100 to 500 sec/100 cc, a porosity of from 20% to 60%, and a mean flow pore size of not greater than 100 nm,
        wherein a half-crystallization period $t_{1/2}$ of the polyolefin microporous membrane is not greater than 2.0 minutes during an isothermal crystallization at 123° C.

7. A rechargeable battery, comprising:
    a battery separator, comprising:
        a polyolefin microporous membrane, comprising:
            a polyolefin resin having an MFR value of not greater than 2.0 g/10 min; and
            a crystal nucleating agent,
            wherein the polyolefin microporous membrane has an air permeation resistance scaled to a thickness of 20 μm of from 100 to 500 sec/100 cc, a porosity of from 20% to 60%, and a mean flow pore size of not greater than 100 nm,
            wherein a half-crystallization period $t_{1/2}$ of the polyolefin microporous membrane is not greater than 2.0 minutes during an isothermal crystallization at 123° C.

8. A method of producing a polyolefin microporous membrane, the polyolefin microporous membrane having an air permeation resistance scaled to 20 μm of from 100 to 500 sec/100 cc, a porosity of from 20% to 60%, and a mean flow pore size of not greater than 100 nm, the method comprising:
- melt-kneading a polyolefin resin, a crystal nucleating agent, and a membrane formation solvent to form a polyolefin resin composition;
- extruding and cooling the polyolefin resin composition to form a gel sheet;
- performing a first stretching step of stretching the gel sheet;
- removing the membrane formation solvent from the gel sheet after stretching; and
- drying the gel sheet after removing the membrane formation solvent.

9. The method according to claim 8, wherein the polyolefin resin has an MFR value of not greater than 2.0 g/10 min.

\* \* \* \* \*